United States Patent [19]

Kobayashi et al.

[11] 4,355,555
[45] Oct. 26, 1982

[54] BANDSAW BLADE DEVIATION DETECTING APPARATUS FOR HORIZONTAL BANDSAW MACHINES

[75] Inventors: Morimasa Kobayashi, Isehara; Nobuo Sakurai, Yokohama, both of Japan

[73] Assignee: Amada Company, Limited, Tokyo, Japan

[21] Appl. No.: 190,236

[22] Filed: Sep. 24, 1980

[30] Foreign Application Priority Data

Sep. 25, 1979 [JP] Japan .................... 54-122021

[51] Int. Cl.³ .............. B23D 53/00; B23D 55/00; B23D 59/00
[52] U.S. Cl. .............................. 83/62.1; 83/789
[58] Field of Search ............ 83/62, 62.1, 72–74, 83/789, 802

[56] References Cited

U.S. PATENT DOCUMENTS

| 2,914,100 | 11/1959 | Lindholm | 83/74 |
| 2,914,102 | 11/1959 | Lindholm | 83/74 |
| 4,034,635 | 7/1977 | Woolston | 83/73 |
| 4,289,053 | 9/1981 | Sawamura | 83/62.1 |

Primary Examiner—Stephen G. Kunin
Assistant Examiner—K. Bradford Adolphson
Attorney, Agent, or Firm—Thompson, Birch, Gauthier & Samuels

[57] ABSTRACT

An apparatus for detecting lateral deviations of a bandsaw blade has a follower which is in contact with and follows lateral movement of the blade. A sensing circuit, which is connected to the follower, generates deviation signals representing movement of the follower. A control circuit which is responsive to the deviation signals stops the bandsaw when the lateral movement of the blade has deviated beyond established limits.

6 Claims, 6 Drawing Figures

BANDSAW BLADE DEVIATION DETECTING APPARATUS FOR HORIZONTAL BANDSAW MACHINES

BACKGROUND OF THE INVENTION

1. Field of the Invention

The present invention relates generally to horizontal bandsaw machines of the type having a flexible endless bandsaw blade trained around a plurality of wheels or pulleys to perform cutting operations and, more particularly, pertains to apparatus for detecting deviations of the bandsaw blade from the desired line of cut in horizontal bandsaw machines.

2. Description of the Prior Art

As is well-known, horizontal bandsaw machines comprise a base on which workpieces to be cut are placed and held and a saw head assembly on which a flexible endless bandsaw blade is trained around a pair of wheels or pulleys, one of which is power driven to drive the bandsaw blade. The bandsaw blade is slidably held and guided by guide means at the cutting zone where cutting operations are to be made so that it may cut into the workpieces therebetween. The saw head assembly is so arranged as to be lowered and raised toward and away from the base around a hinge pin or along a vertical guide means. Such movement is achieved by employing any suitable means such as a hydraulic motor. Thus, in cutting operations, the saw head assembly is lowered toward the base from its raised position so as to enable the bandsaw blade being driven therein to cut the workpieces which have been placed on the base. Also, in automatic horizontal bandsaw machines, there are provided arrangements for automatically raising and lowering the saw head assembly and automatically feeding the workpieces into the cutting zone after the completion of each cutting cycle.

One problem associated with horizontal bandsaw machines of the above described type is that for various reasons, the flexible bandsaw blade will often deviate laterally from the desired line of cut, even though it is guided by the guide means at the cutting zone. In particular, the bandsaw blade has a tendency to laterally deviate as it becomes worn and especially when cutting difficult-to-cut materials such as stainless steels, heat-resisting steels and anticorrosion alloys. Of course, such deviations of the bandsaw blade will result in poor cutting accuracy and short life of the bandsaw blade and furthermore will often necessitate a wasteful scrapping of off-gauge reject workpieces. Since the deviations of the bandsaw blade cannot be readily noticed during cutting operations, it has often happened that a number of reject workpieces are automatically and continuously produced in automatic horizontal bandsaw machines. For these reasons, it has been seriously desired to detect the deviations of the bandsaw blade in as little time as possible especially in automatic horizontal bandsaw machines which should require no operators or save operators from watching.

SUMMARY OF THE INVENTION

It is an object of the present invention to provide an apparatus for detecting deviations of the bandsaw blade from the desired line of cut to be made on workpieces during cutting operations in horizontal bandsaw machines.

It is another object of the present invention to provide an apparatus for detecting deviations of the bandsaw blade from the desired line of cut and simultaneously stopping the same from motion in horizontal bandsaw machines.

It is a further object of the present invention to provide an apparatus for horizontal bandsaw machines which can stop the bandsaw blade as soon as it deviates more than a selectively determined distance from the desired line of cut.

These objects can be accomplished by providing a horizontal bandsaw machine with a detecting means for detecting deviations of the bandsaw blade and an actuating means which can stop the bandsaw blade when it has deviated an amount which is selectively predetermined.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
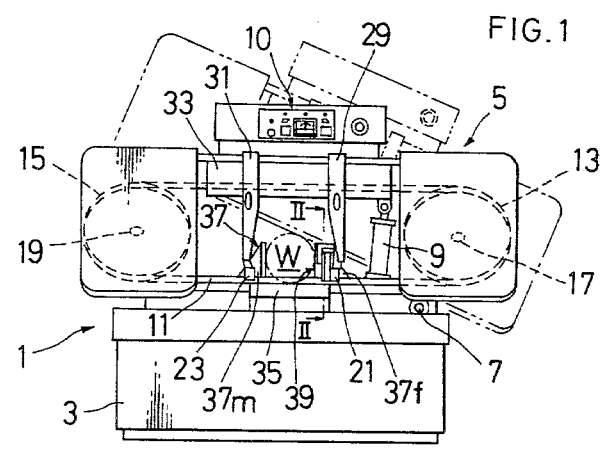
FIG. 1 is a front elevational view of a horizontal bandsaw machine which is provided with an apparatus embodying the principles of the present invention.
Figure 2:
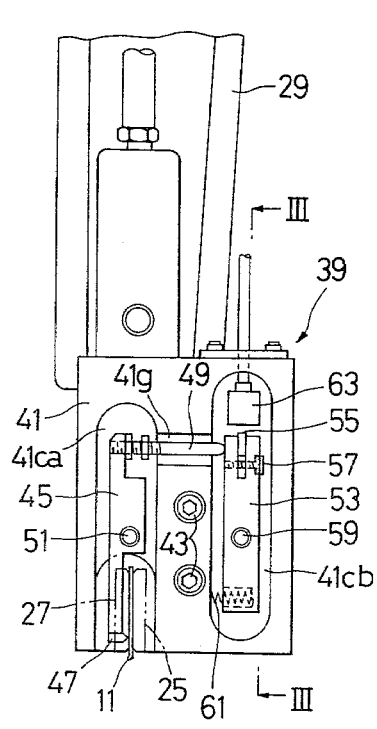
FIG. 2 is a sectional view taken substantially along the lines II—II of FIGS 1 and 3.

Referring now to FIG. 1, there is shown a horizontal bandsaw machine which is generally designated by the numeral 1 and which comprises a box-like base 3 and a saw head assembly 5 vertically movable toward and away from the base 3 as is conventional. The saw head assembly 5 is pivotally connected to the base 3 by means of a hinge pin 7 and is so arranged as to be raised away from and lowered toward the base 3 by a hydraulic motor 9 which is of a cylinder type. In the saw head assembly 5, a flexible endless bandsaw blade 11 is trained around a driving wheel 13 and a driven wheel 15 having shafts 17 and 19, respectively, so that it may be driven to make a cutting action when the driving wheel 13 is power driven. The bandsaw blade 11 at the cutting zone of the horizontal bandsaw machine 1 is slidably held or guided with its cutting edge faced vertically downwardly by a pair of guide assemblies 21 and 23 each having a pair of guide members 25 and 27 between which the bandsaw blade 11 is slidingly passed as shown in FIG. 2. The guide assemblies 21 and 23 are detachably fixed or integrally provided at lower ends of depending arm members 29 and 31, respectively, which are adjustably held by a beam member 33 fixed at any upper portion of the saw head assembly 5. Also, a work-table 35 is mounted at the cutting zone on the base 3 so that a workpiece W to be cut may be placed thereon, and a vise assembly 37 having a fixed jaw 37f and a movable jaw 37m is also mounted on the base 3 to hold the workpiece W to be cut therebetween. Thus, when the saw head assembly 5 is swung down around the hinge pin 7 from its raised position shown by the imaginary lines in FIG. 1, the bandsaw blade 11 rotating around the driving wheel 13 and a driven wheel 15 in the saw head assembly 5 will be fed to cut the workpiece W held by the vise assembly 37 on the work-table 35. Also, the horizontal bandsaw machine 1 may be so arranged that the saw head assembly 5 can be automatically raised and lowered for each cutting cycle and may be provided with an automatic feeding apparatus which will feed the workpiece W to be cut after each completion of cutting cycles.

In this connection, it should be noted that the present invention is applicable to any suitable known type of horizontal bandsaw machines, although the invention has been and will be described hereinbefore and hereinafter with reference to the horizontal bandsaw machine 1 in which the saw head assembly 5 carrying the bandsaw blade 11 is pivoted about the hinge pin 7. For example, the present invention is also applicable to horizontal bandsaw machines in which a cutting head assembly is vertically moved in its entirety along one or more vertical guide means such as a post or posts.

In order to detect the bandsaw blade 11 deviating from its proper course and stop the same from moving, there is provided a detecting apparatus 39 which is attached to the guide assembly 21 in the preferred embodiment in such a manner as to be located between the guide assembly 21 and the workpiece W to be cut. Of course, the detecting apparatus 39 can be mounted in any other suitable manner between the guide assemblies 21 and 23 as will be understood as the description proceeds, although it should preferably be located between the guide assembly 21 and the workpiece W to be cut.

Figure 3:
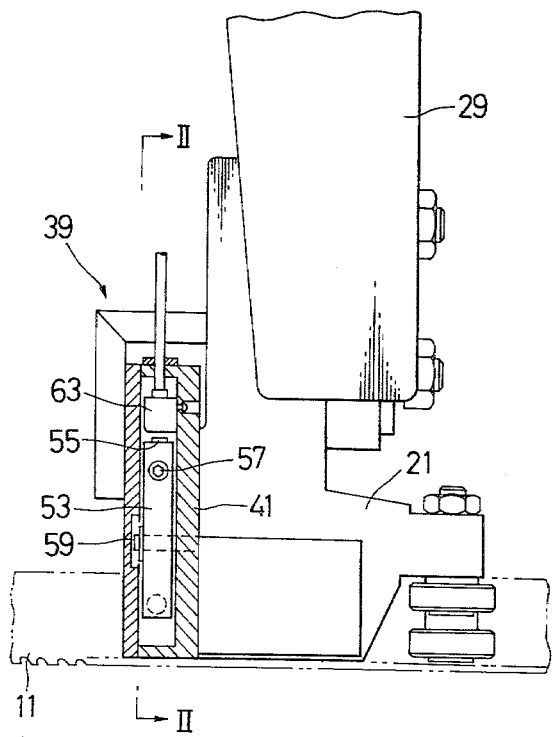
FIG. 3 is a sectional view taken substantially along the line III—III of FIG. 2.

Referring to FIGS. 2 and 3, the detecting apparatus 39 comprises a base plate member 41 which is more or less square in shape and is fixed to the left-hand side of the guide assembly 21 by means of a plurality of bolts 43. In the preferred embodiment, the base plate member 41 is provided with lengthwise elongate concavities 41ca and 41cb and a horizontal groove 41g connecting the concavities 41ca and 41cb for the purpose to be seen soon from the following description. The detecting apparatus 39 comprises also an elongate rockable lever member 45 which is disposed in a substantially vertical position on the base plate member 41 and is provided with a detecting member 47 and a push rod member 49 at its lower and upper ends, respectively. The rockable lever member 45 is pivotally supported at its substantially midway portion by a hinge pin 51 which is fixed to the base plate member 41 in a manner such that the detecting member 47 is kept in contact with one side of the bandsaw blade 11. Thus, the rockable lever member 45 is so disposed as to be rockable about the hinge pin 51 in a plane parallel to the base plate member 41 so as to keep the detecting member 47 in contact with the bandsaw blade 11. The push rod member 49 of the rockable lever member 45 is fixed to the rockable member 45 substantially at a right angle and in parallel to the base plate member 41 so that it may be moved together with the rockable lever member 45 in a plane parallel to the base plate member 41. Also, in the preferred embodiment, the rockable lever member 45 is disposed to be rocked in the concavity 41ca of the base plate member 41, and the push rod member 49 is disposed to extend along the groove 41g of the base plate member 41 and project in the concavity 41cb of the same.

The detecting apparatus 39 comprises further a rockable arm member 53 which is disposed in a substantially vertical position in a manner such that its upper portion is kept pressed by the projecting end of the push rod member 49. The rockable arm member 53 is provided at its top end with a chip member 55 which is of a magnetic material and adjustably held by a set screw 57 at its top end of the rockable arm member 53 in such a manner as to adjutably project upwardly. Also the rockable arm member 53 is supported at its substantially midway portion by a hinge pin 59 which is fixed to the base plate member 41, and it is kept biased by a spring member 61 so as to oppose the push rod member 49. In the preferred embodiment, the rockable arm member 53 is disposed to be rockable in the concavity 41cb formed on the base plate member 41 as best seen in FIG. 2.

From the above description, it will be understood that the rockable lever member 45 is urged by the spring member 61 by means of the rockable arm member 53 and the push rod member 49 so as to keep the detecting member 47 urged to the bandsaw blade 11. Accordingly, if the bandsaw blade 11 is bent to deviate from its proper course in the direction away from the detecting member 47, the rockable lever member 45 will be rotated around the hinge pin 51 counterclockwise as viewed in FIG. 2 and at the same time the rockable arm member 53 will be rotated around the hinge pin 59 counterclockwise by the spring member 61. To the contrary, when the bandsaw blade 11 is bent to deviate against the detecting member 47, the rockable lever member 45 will be rotated about the hinge pin 51 clockwise to force the push rod member 49 to move the rockable arm member 53 against the spring member 61. Of course, it will be understood that the chip member 55 is moved together with the rockable arm member 53 when the detecting member 47 is moved by the bandsaw blade 11 to rock the rockable lever member 45. Also, it will be understood that the movement or displacement of the chip member 55 can be taken as the degree of the deviation of the bandsaw blade 11 from its proper course.

In order to sense the deviations of the bandsaw blade 11 and stop the bandsaw blade 11 together with the entire horizontal bandsaw machine 1, there is provided a sensing means 63 such as a differential transformer and a magnetic sensor which is so disposed as to sense the movement of the chip member 55. The sensing means 63 is so arranged as to sense the movement or displacement of the chip member 55 and transform the same to an electric signal, and it is disposed just above the chip member 55 in the preferred embodiment.

Figure 4:
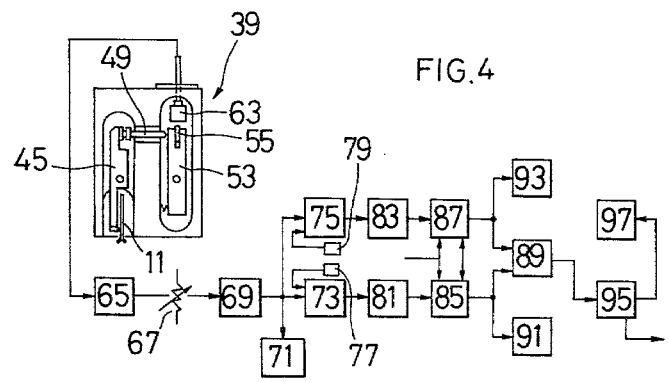
FIGS. 4 and 5 are diagrammatic views including control circuits and embodying the principles of the present invention.

Referring to FIG. 4, the sensing means 63 of the detecting apparatus 39 is connected to a detecting means 65 which is so arranged as to generate or produce a DC voltage in proportion to the movement or displacement of the chip member 55 that is the degree of the deviation of the bandsaw blade 11 from its proper course. More particularly, the detecting means 65 is so arranged as to make no action and therefore generate no voltage when the bandsaw blade 11 is following its proper course but generate a positive (+) or negative (−) voltage when the bandsaw blade 11 deviates in either direction away from its proper course. Accordingly, the detecting means 65 can be so arranged, for example, as to generate a positive voltage when the bandsaw blade 11 deviates in the direction away from the detecting member 47 and produce a negative voltage when it deviates against the detecting member 47.

The detecting means 65 is connected to a variable attenuator 67, which is connected to an amplifier 69, so as to transmit the positive or negative voltage in proportion to the degree of the deviation of the bandsaw blade 11 from its proper course. The variable attenuator 67 is so arranged as to be adjusted according to the span between the guide assemblies 21 and 23 of the horizontal bandsaw machine 1 which is generally adjusted according to the size of the workpiece W to be cut. Thus, the positive or negative voltage generated by the detecting means 65 is transformed by the variable attenuator 67 according to the span between the guide assemblies 21 and 23, and it is transmitted to the amplifier 69 for amplification.

The amplifier 69 is connected in parallel to a voltmeter 71, a positive limit detecting comparator 73 and a negative limit detecting comparator 75 to transmit the voltage after amplification. The voltmeter 71 is provided to indicate the degree and direction of the deviation of the bandsaw blade 11 from its proper course, and it is preferably of an analog type. The positive and negative limit detecting comparators 73 and 75 are connected with adjusting means 77 and 79, respectively, for reference voltages, and also they are connected to integration circuits 81 and 83, respectively, which are connected to memory circuit 85 and 87, respectively. The positive and negative limit detecting comparators 73 and 75 are so arranged as to be previously stored with the reference voltages by the adjusting means 77 and 79, respectively, to determine the positive and negative limits of the deviation of the bandsaw blade 11. Also, the positive and negative limit detecting comparators 73 and 75 are so arranged as to compare the reference voltages and the voltage transmitted by the amplifier 69 and actuate the integration circuits 81 and 83 when the voltage transmitted by the amplifier 69 is larger than the reference voltages. As will be understood to those skilled in the art, the positive limit detecting comparator 73 works only when a positive voltage is transmitted by the amplifier 69, and the negative limit detecting comparator 75 works only when a negative voltage is transmitted. Also, the integration circuits 81 and 83 are so arranged as to prevent a suddenly increased voltage from being transmitted to the memory circuits 85 and 87. The memory circuits 85 and 87 are interlocked with each other and are mutually connected to an OR circuit 89, and also they are connected with pilot lamps 91 and 93. The OR circuit 89 is connected to a control circuit 95 which is arranged to control the sequence control circuit of the horizontal bandsaw machine land is connected to a pilot lamp 97. The OR circuit 89 is so arranged as to transmit a signal to the control circuit 95 when a signal is made by either of the memory circuit 85 or 87 to stop the horizontal bandsaw machine 1. Also, the lamps 91, 93 and 97 are provided to indicate that the bandsaw blade 11 has deviated from its proper course beyond the limits previously set by the adjusting means 77 and 79.

Figure 5:
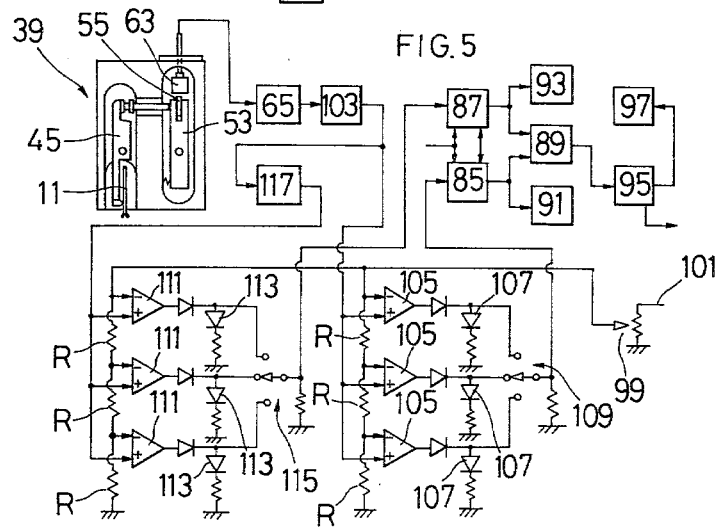
Figure 6:
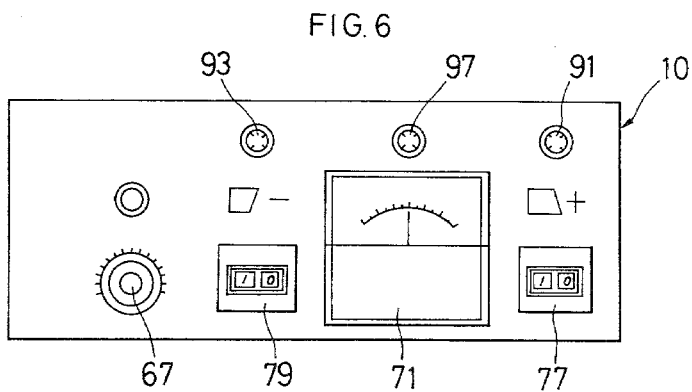
FIG. 6 shows a control board which can be connected with control circuits of FIGS. 4 and 5.

Referring to FIG. 5, there is shown a modified embodiment which is more or less similar to the first embodiment shown in FIG. 4. In this embodiment, the variable attenuator 67 of the first embodiment is replaced by a variable resistor 99 which is connected to a reference voltage 101, and the amplifier 69 and the integration circuits 81 and 83 are replaced by an amplifier 103 having a low-pass filtering characteristic. The positive limit detecting comparator 73 of the first embodiment is replaced by a plurality of comparators 105 connected with light-emitting diodes 107 connected to a selector switch 109. Similarly, the negative limit detecting comparator 75 is replaced by a plurality of comparators 111 which are provided with light-emitting diodes 113 connected with a selector switch 115 and are connected to the amplifier 103 through an inverting amplifier 117.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A bandsaw blade deviation detecting apparatus for a bandsaw machine, said apparatus detecting the lateral deviations of a bandsaw blade which is guided by a pair of guide assemblies disposed along the line of cut, said apparatus comprising detecting means for detecting lateral division of the bandsaw blade, means for transforming the detected deviation signals into signals related to the span between the guide assemblies and the lateral deviation of the bandsaw blade from the line of cut, means for previously setting positive and negative allowable limits of the deviations of the bandsaw blade from the line of cut, comparing means for comparing said detected deviation and said previously set allowable limits and for generating a stop signal representative of deviation outside said allowable limits, and a control circuit for stopping the bandsaw machine when said stop signal is generated by said comparing means.

2. In a bandsaw machine employing a flexible cutting blade moving between guide assemblies spaced along the line of cut, an apparatus for detecting lateral blade deviations from said line of cut, said apparatus comprising:

follower means adapted to physically contact said blade and to move in response to lateral blade deviations, signal generating means responsive to movement of said follower means for generating direct current signals, the magnitude of said direct current signals being proportional to the extent of blade deviation and the polarity of said direct current signals being indicative of the direction of blade deviation, adjustable control means for controlling the magnitude of said direct current signals as a function of the distance between said guide assemblies, adjustable reference means for establishing reference signals representative of acceptable limits of blade deviation from said line of cut, and means for comparing the magnitude of the signals received from said control means to the reference signals established by said reference means and for generating a stop signal when said control means signal exceeds said reference signal, said stop signal operative to stop the bandsaw blade.

3. The apparatus of claim 2 wherein said adjustable control means is comprised of a variable attenuator.

4. The apparatus of claim 2 wherein said adjustable control means is comprised of a variable resistor connected to a reference voltage.

5. The apparatus of claim 2 wherein said follower means is comprised of a first pivotal lever having one end arranged to frictionally contact one side of the cutting blade, the opposite end of said first lever being provided with a rod acting on a second pivotal lever carrying a magnetic element.

6. The apparatus of claim 5 wherein said signal generating means includes magnetic sensing means for sensing movement of said magnetic element and for generating a signal indicative of the degree of relative movement between said magnetic element and said magnetic sensing means.

* * * * *